June 15, 1965  D. O. NOORLANDER  3,189,002
VACUUM STABILIZING UNIT FOR MILKING SYSTEMS
Filed Feb. 6, 1963

INVENTOR.
Daniel O. Noorlander
BY *Bayard H. Michael*
Attorneys

United States Patent Office 3,189,002
Patented June 15, 1965

3,189,002
VACUUM STABILIZING UNIT FOR MILKING SYSTEMS
Daniel O. Noorlander, Madison, Wis., assignor to Dairy Equipment Company, Madison, Wis., a corporation of Wisconsin
Filed Feb. 6, 1963, Ser. No. 256,573
3 Claims. (Cl. 119—14.07)

This invention relates to milking machine systems and particularly to an improvement in the vacuum system stabilizing the vacuum to minimize damage to the teats of the cow.

Improper vacuum in the teat cups and claw of a milking system can predispose the animal to mastitis either by failure to relieve the vacuum on the teat (with consequent congestion) alone or in combination with a backwashing of the teat in the rest phase under conditions encouraging entry of bacteria into the teat. While studies in which I took part at the University of California have shown that machine milking can frequently lead to mastitis the dairy industry continues to spend vast sums on treatment without attacking the fundamental problem of proper system design. A flooded milk line from the claw can have immediate adverse effect on the vacuum and this is particularly true in pipeline installations (which, incidentally, can give rise to vacuum problems without flooded milk lines). The present invention is addressed to the stabilization of vacuum in milking systems.

The principal object of this invention is to so stabilize the milking system vacuum that the inflations of the teat cup can function properly (assuming the inflation is the proper design for the teats).

This object is attained by placing what I choose to call a vacuum stabilizer unit between the claw and the milk line. This unit is used so as to limit the possible reduction in vacuum at the claw by reason of a flooded milk line or poor operation or control of the vacuum pump. The unit is positoned to limit the lift from the claw to the unit to a maximum of one foot, for example, so even if the milk line floods there is still enough vacuum to insure proper collapse of the inflation in the teat cup. The unit acts to separate the air and milk at the unit and the milk is then pumped to the milk line so the desired vacuum can be maintained at the unit and, hence, at the claw and teat cups. The lift distance between the unit and the milk line cannot affect the vacuum since the milk is pumped this distance.

Other objects and advantages will be pointed out in, or be apparent from, the specifications and claims, as will obvious modifications of the single embodiment shown in the drawings, in which:

Figure 1:
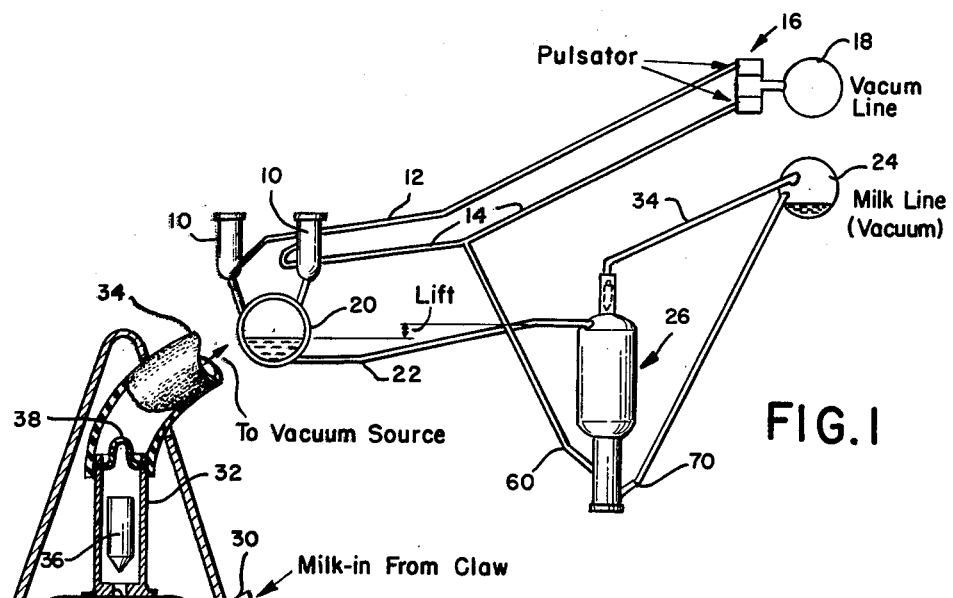
FIG. 1 shows the vacuum stabilizing unit in the milking system.

In the FIG. 1 the teat cups 10 are connected by lines 12, 14 to the pulsator 16 which, in turn, connects to the vacuum line 18 in the usual manner. The pulsator operates as usual to subject the outside of the teat cup inflation to vacuum (milking phase) or to atmosphere (rest phase). The milk flows from the cups to the claw 20 which has a line 22 which is normally connected to the milk line 24 but in this case is connected to the vacuum stabilization unit 26. The milk from the claw flows into the upper end of the receiving chamber 28 of the unit through inlet 30. The receiving chamber volume is less than the full milk of a cow. The chamber is maintained under vacuum by reason of the connection of the connector 32 to the upper evacuated portion of the milk line 24 through tube 34. Alternatively, the tube could be connected to vacuum line 18. Connector 32 is provided with a weight type check or pressure reducing valve 36 which is retained by spider 38 and cooperates with orifice 40 to maintain a 1″ (Hg) pressure drop, for example, so the pressure in the chamber is slightly above the vacuum pressure.

The bottom of chamber 28 is provided with orifices 42 which lead to the accumulator chamber 44 past a flexible rubber check valve 46. Chamber 44 is inside a rubber sleeve 48 which has its ends rolled over the ends of a metal sleeve 50 so as to constitute a flexible lining. The two sleeves are retained in position against the bottom of the chamber 28 by an outlet member 52 which has a screw type clamp 54 acting thereagainst. The clamp is carried in frame 56 which supports the entire unit.

Figure 2:
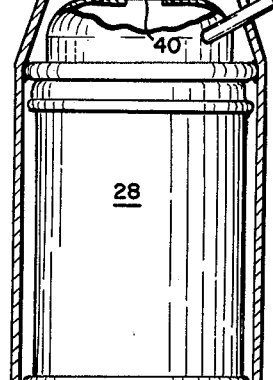
FIG. 2 is a detailed showing of the unit.

Sleeve 50 is provided with a spud 58 to which tube 60 is connected for connecting to pulsator line 14. This allows the space between the sleeves to be connected to vacuum (FIG. 2) or to atmosphere (FIG. 3) to expand and collapse sleeve 48. Outlet member includes orifices 62 leading past check valve 64 into chamber 66 which is provided with a spud 68 to which tube 70, leading to the milk line, is connected.

Figure 3:
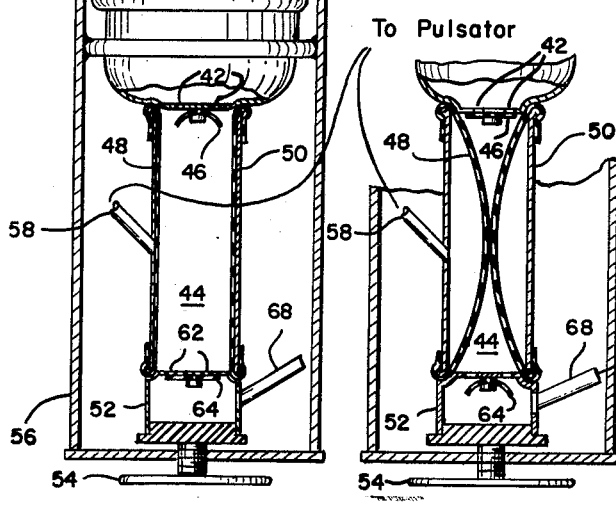
FIG. 3 is a fragmentary view of part of FIG. 2 showing the pumping unit expelling to the milk line.

In operation the milk line vacuum is reflected at the receiving chamber 28 and this, in turn, is reflected at the claw 20 and cups 10. Milk will flow to chamber 28. Since the vacuum in the vacuum line 18 is greater than the reduced vacuum (reduced by valve 36) the rubber sleeve 48 will expand as in FIG. 2 when the pulsator 16 connects the space between sleeves 48 and 50 to the vacuum line. At this time milk will flow from chamber 28 into accumulator 44. When the pulsator now connects the space between the sleeves to atmosphere the rubber sleeve 48 will collapse (FIG. 3). This will seat check valve 46 and open valve 64 to force milk into the line 70 for delivery to the milk line. When the pulsator reconnects the space between the accumulator sleeve to vacuum the pressure in accumulator 44 will drop below that in chamber 28 to force milk from 28 into the accumulator. At this time, due to milk in line 70, the vacuum in outlet chamber 66 will likely be above the pressure in accumulator 44 so valve 64 will seat to prevent back flow of milk.

Since the vacuum (air) and milk lines are, in effect, separated at the stabilizing unit the height to which the milk is lifted thereafter cannot affect the vacuum at the claw so if the lift from the claw to the unit is kept small there can be no loss of adequate vacuum at the claw and cups. Therefore, the inflations in the cups can perform properly and the teats can be properly relieved during the rest phase with consequent avoidance of congestion and predisposition to mastitis.

Although but one embodiment of the present invention has been illustrated and described, it will be apparent to those skilled in the art that various changes and modifications may be made therein without departing from the spirit of the invention or from the scope of the appended claims.

I claim:
1. In a milking system for delivering milk from the claw of a milking unit to a milk line comprising:
   a vacuum stabilizing unit including a chamber connected to the claw for receiving milk therefrom, said unit including pump means for pumping milk from said chamber to said milk line;
   means for drawing a vacuum on said chamber; and
   means for drawing a vacuum on the outlet of said pump means to facilitate the pumping of milk to the milk line, said last mentioned means including a means for subjecting said milk line to vacuum and a milk carrying conduit connected between said pump outlet and said milk line.

2. In a milking system for delivering milk from the claw of a milking unit to a milk line comprising:
a source of vacuum;
a pulsator connected to said source of vacuum for operating the milking unit;
a vacuum stabilizing unit including a first chamber connected to the claw for receiving milk therefrom;
a pump means associated with said vacuum stabilizing unit for pumping milk from said chamber to said milk line, said pump means including a second chamber at least part of which is defined by a flexible wall and a flexing means for alternately subjecting said flexible wall to vacuum and atmosphere through the operation of said pulsator;
connecting means between said first chamber and said source of vacuum to cause flow from the claw to said chamber; and
pressure reducing means in said connecting means to facilitate expansion of said second chamber when said flexible wall is subjected to a vacuum by said pulsator.

3. In a milking system according to claim 2 in which there is a means for drawing a vacuum on the outlet of said second chamber to facilitate the pumping of milk from said second chamber to the milk line.

References Cited by the Examiner

UNITED STATES PATENTS

| | | | |
|---|---|---|---|
| 2,725,850 | 12/55 | Makous | 119—14.07 |
| 2,786,445 | 3/57 | Golay | 119—14.07 |
| 2,805,643 | 9/57 | Hill | 119—14.07 |
| 3,077,180 | 2/63 | Hagg et al. | 119—14.01 |

FOREIGN PATENTS 110,006  3/40  Australia.

SAMUEL KOREN, *Primary Examiner.*

CARL W. ROBINSON, HUGH H. CHAMBLEE, *Examiners.*